US008364105B2

(12) United States Patent
McKay et al.

(10) Patent No.: US 8,364,105 B2
(45) Date of Patent: Jan. 29, 2013

(54) SOLAR POWERED TRANSMITTER

(75) Inventors: John C. McKay, Placentia, CA (US);
Stephen E. Hannah, Placentia, CA (US); Jesse M. James, Ladera Ranch, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 63 days.

(21) Appl. No.: 13/151,198

(22) Filed: Jun. 1, 2011

(65) Prior Publication Data

US 2011/0237209 A1    Sep. 29, 2011

Related U.S. Application Data

(63) Continuation of application No. PCT/US2009/066840, filed on Dec. 4, 2009.

(60) Provisional application No. 61/120,331, filed on Dec. 5, 2008.

(51) Int. Cl.
  *H04B 1/04* (2006.01)
(52) U.S. Cl. .................. 455/129; 343/878; 343/882
(58) Field of Classification Search .................. 455/12.1, 455/550.1, 561, 562.1, 575, 90.1, 90.3, 91, 455/101, 128, 129, 269, 347, 351; 343/865, 343/868, 874, 979, 880, 882, 887
See application file for complete search history.

(56) References Cited

U.S. PATENT DOCUMENTS

| 5,719,555 A | 2/1998 | Zeytoonjian et al. | |
| 2003/0142033 A1* | 7/2003 | Pepperling et al. | 343/878 |
| 2004/0185776 A1* | 9/2004 | Wang et al. | 455/12.1 |
| 2005/0068238 A1 | 3/2005 | Haaft et al. | |
| 2009/0011721 A1* | 1/2009 | Onose | 455/90.3 |
| 2010/0201600 A1* | 8/2010 | Kaneff | 343/882 |

FOREIGN PATENT DOCUMENTS

| JP | 03-019432 | 1/1991 |
| JP | 2001-036323 | 2/2001 |
| WO | WO 2010/065904 A3 | 6/2010 |

OTHER PUBLICATIONS

International Preliminary Report on Patentability in International Application No. PCT/US2009/066840, issued Jun. 7, 2011, 4 pages.
International Search Report and Written Opinion in International Application No. PCT/US2009/066840, mailed Jun. 25, 2010, 6 pages.

* cited by examiner

*Primary Examiner* — Thanh Le
(74) *Attorney, Agent, or Firm* — Knobbe, Martens, Olson & Bear, LLP

(57) ABSTRACT

An embodiment of a light powered transmitter configured for broadcasting an electromagnetic control field to a region is provided. The transmitter includes a housing having a longitudinal axis. The housing includes a photovoltaic cell configured to generate electrical power in response to light and a rechargeable power source configured to store at least a portion of the power generated by the photovoltaic cell. The housing also includes an electromagnetic transmitter and a directional antenna. The directional antenna can be configured to broadcast an electromagnetic (e.g., radio-frequency) control field to a region. The directional antenna can be rotatably mounted in the housing such that the antenna can be rotated around the longitudinal axis. The housing can further include a transparent or translucent optical element configured to receive the light and converge at least a portion of the light onto the photovoltaic cell.

35 Claims, 15 Drawing Sheets

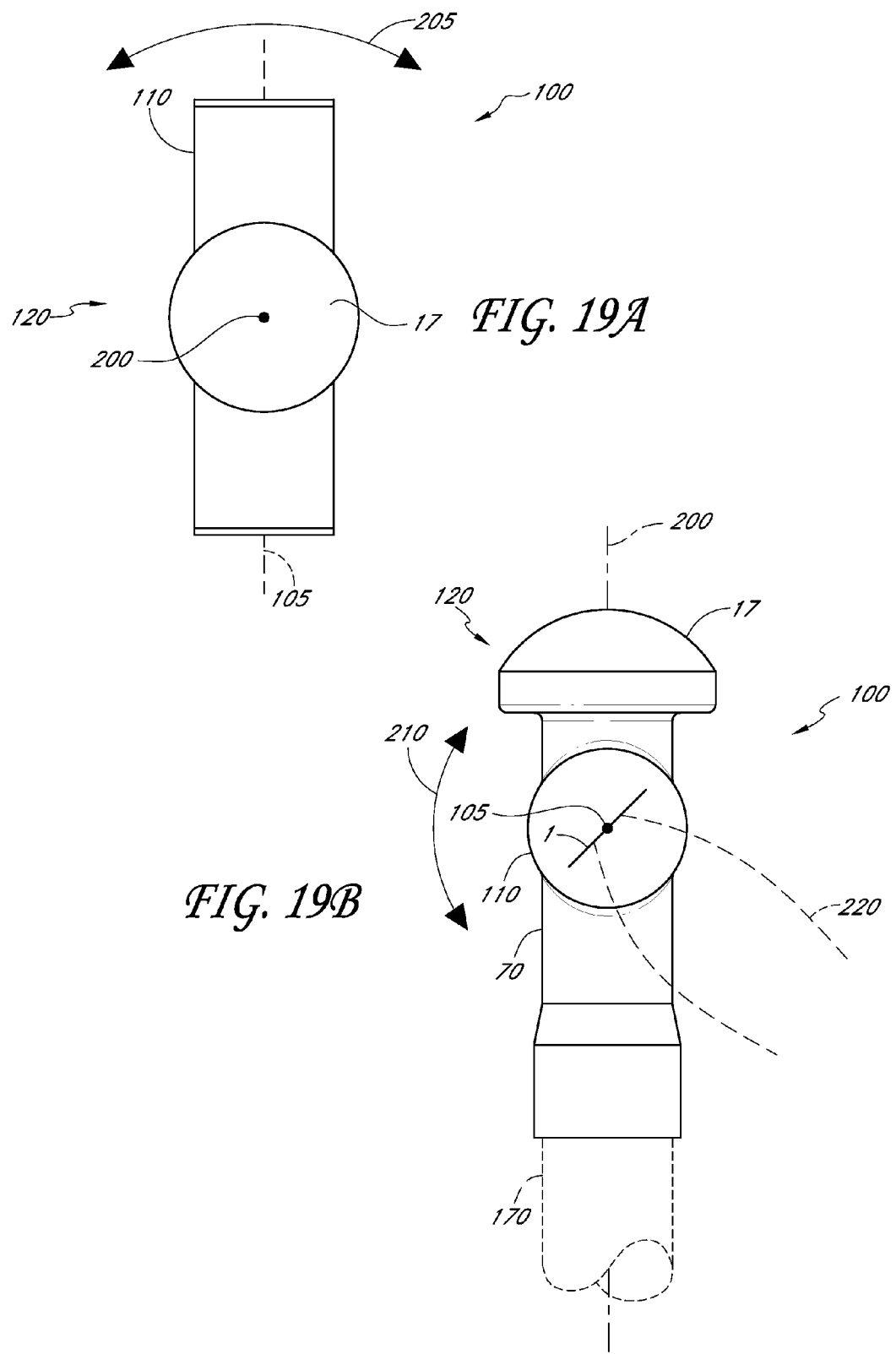

SOLAR POWERED TRANSMITTER

CROSS-REFERENCE TO RELATED APPLICATIONS

This application claims the benefit under 35 U.S.C. §120 and 35 U.S.C. §365(c) as a continuation of International Application No. PCT/US2009/066840, designating the United States, with an international filing date of Dec. 4, 2009, entitled "SOLAR POWERED TRANSMITTER," which claims the benefit under 35 U.S.C. §119(e) to U.S. Provisional Patent Application No. 61/120,331, filed Dec. 5, 2008, entitled "Solar Powered Transmitter," the entire disclosures of each of the aforementioned applications are hereby expressly incorporated by reference herein in their entireties.

BACKGROUND

1. Field

This application relates to a solar powered transmitter comprising an antenna and provides methods for operating and adjusting the transmitter. The transmitter can be used to transmit a control field for providing a containment area for vehicles, such as shopping carts.

2. Description of Related Art

Motorized and/or non-motorized (e.g., human-propelled) vehicles are used in a wide range of applications. In some of these applications, it may be desirable to provide a vehicle containment system that can be used to inhibit or prevent the vehicle from moving into or out of a containment area. The containment area may include or demarcate an unsafe or undesirable region for vehicle movement or a region in which the vehicle should be confined. In one illustrative example, a shopping cart containment system can be used to deter theft of shopping carts from a retail location such as, e.g., a supermarket.

In some implementations, a boundary of the containment area is marked, and movement of the vehicle across the boundary triggers the containment system to inhibit or prevent movement of the vehicle. In some such implementations, the boundary of the containment area can be marked, for example, by using a buried wire cable that transmits an electromagnetic control signal, by placing or embedding magnets at the boundary, or by broadcasting an electromagnetic control signal from a wireless access point.

In some embodiments suitable for human-propelled vehicles (e.g., carts), a wheel brake mechanism is disposed in or on one or more wheels of the cart. When the cart is moved across the boundary, a sensor in the cart (e.g., in the wheel) detects the control signal, and in response, the wheel brake mechanism is actuated and inhibits the wheel from rotating (e.g., the wheel may lock or be difficult to turn). Such a system advantageously deters theft (and/or inhibits movement of carts into undesirable and/or unsafe areas), because a user will have to drag (or carry) the cart once the wheel has locked. An authorized attendant can use a handheld remote control, a key, or other unlocking mechanism to unlock the wheel, thereby permitting the cart to be rolled back to the retail location.

SUMMARY

Embodiments of the solar powered transmitter described herein advantageously can be used with vehicle containment systems to transmit an electromagnetic control signal that at least partially defines a containment area.

An embodiment of a solar powered transmitter configured to transmit a radio-frequency control signal to a region is provided. The transmitter comprises an elongated housing having a longitudinal axis. The elongated housing comprises a mount configured to permit the elongated housing to be rotated around a mount axis. The mount axis can be non-parallel to the longitudinal axis. The transmitter further comprises a directional antenna disposed substantially along the longitudinal axis of the elongated housing. The directional antenna can be configured to be at least partially rotatable around the longitudinal axis. The transmitter further comprises an antenna adjustment mechanism coupled to the directional antenna. The antenna adjustment mechanism can be configured to permit the directional antenna to be at least partially rotated around the longitudinal axis. The antenna adjustment mechanism can be accessible from outside the housing. The transmitter further comprises a solar panel disposed in a solar panel housing portion of the elongated housing. The solar panel housing portion comprises an optical element that is substantially transparent to visible light and configured to transmit the visible light to the solar panel. The transmitter further comprises a rechargeable power storage medium disposed in the housing. The rechargeable power storage medium can be configured to be recharged by the solar panel. The solar powered transmitter also comprises a radio-frequency transmitter disposed in the housing. The radio-frequency transmitter can be electrically coupled to the directional antenna in order to transmit the radio frequency control signal to the region.

An embodiment of a light powered transmitter configured for broadcasting an electromagnetic control field to a region is provided. The light powered transmitter comprises a housing having a longitudinal axis. The housing comprises a photovoltaic cell configured to generate electrical power in response to light and a rechargeable power source electrically coupled to the photovoltaic cell. The rechargeable power source can be configured to store at least a portion of the power generated by the photovoltaic cell. The housing also comprises an electromagnetic transmitter and a directional antenna electrically coupled to the electromagnetic transmitter. The directional antenna can be configured to broadcast an electromagnetic control field to a region. The directional antenna can be rotatably mounted in the housing such that the antenna can be rotated around the longitudinal axis. The housing can further comprise a transparent or translucent optical element configured to receive the light and converge at least a portion of the light onto the photovoltaic cell.

An embodiment of a solar powered transmitter for transmitting a radio-frequency signal is provided. The solar powered transmitter comprises means for transmitting a radio-frequency signal, means for generating electrical power from sunlight, and means for storing electrical power. The transmitting means comprises means for directionally radiating the radio-frequency signal. The power storing means can be rechargeable by the power generating means. The transmitter also comprises means for housing the signal transmitting means, the power generating means, and the power storing means. The housing means has a longitudinal axis and can be configured to allow the radiating means to rotate at least partially around the longitudinal axis of the housing means. The power generating means can be disposed in the housing means so that the power generating means can receive the sunlight. The transmitter can also include means for mounting the solar powered transmitter. The mounting means can be configured to allow the transmitter to be rotated around a mounting axis that is non-parallel to the longitudinal axis.

BRIEF DESCRIPTION OF THE DRAWINGS

Specific embodiments of the disclosure will now be described with reference to the drawings summarized below. These specific embodiments are intended to illustrate, and not limit, the scope of the disclosure.

FIG. 19A is a top view schematically illustrating rotation of the transmitter in a first plane (e.g., a horizontal plane).

FIG. 19B is an end view schematically illustrating rotation of an antenna assembly around a longitudinal axis of the housing in an embodiment of a solar powered transmitter.

DETAILED DESCRIPTION OF EMBODIMENTS

Figure 1:
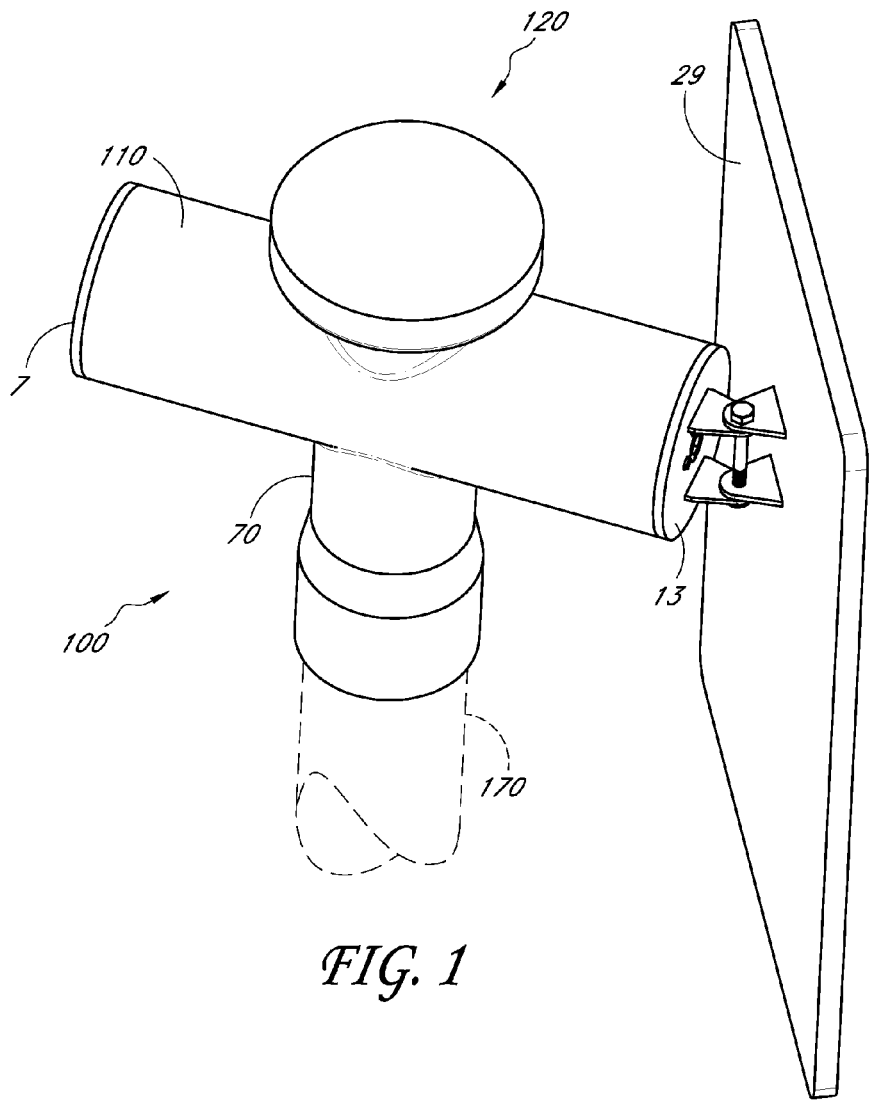
FIG. 1 is a perspective view that schematically illustrates an embodiment of a solar powered transmitter.

Embodiments of the solar powered transmitter described herein advantageously can be used with containment systems to transmit a control signal for a containment area. Containment systems advantageously may be used to contain or confine motorized and/or non-motorized vehicles including, but not limited to, human-propelled vehicles and carts, shopping carts, warehouse carts, industrial carts, luggage carts, baggage carts, trolleys, medical equipment carts, wheelchairs, wheeled stretchers, strollers, beds, golf carts, personal mobility vehicles, and so forth. For example, embodiments of the solar powered transmitter can be used with systems for tracking locations and statuses of wheeled vehicles. In other implementations, the solar powered transmitter can be used to provide a control field detectable by objects other than vehicles (e.g., by a receiver coupled to merchandise or inventory, to personnel, etc.). Other uses and applications are possible.

Certain advantageous examples of the solar powered transmitter will now be described. These examples are intended to illustrate, but not to limit, the scope of the disclosure. In one example, a battery powered radio capable of transmitting a 2.4 GHz signal through a horizontally oriented directional antenna is used to transmit a shaped communication and control field. The power of the signal generating the control field is capable of being adjusted in order to define, at least in part, the shape and/or strength of the control field. A power source for powering the radio (and other electronic components) can be rechargeable using a solar panel. The power source can comprise one or more rechargeable batteries and/or one or more ultracapacitors. The solar panel can be mounted at the top of a weather-proof housing and under a transparent lens. The lens can be shaped to allow for the transmission of sunlight at a wide range of angles onto the solar panel. In some embodiments, the housing is a sealed unit comprising the solar panel, the power source, the antenna, the radio transmitter, and associated electronic controls. The housing can be weatherproof, water resistant, and/or tamper-proof. In other embodiments, the transmitter can be mounted so that the directional antenna is oriented vertically or at any other desired angle or direction.

In some example transmitters, the focal point of the directional antenna disposed in the housing can be angularly adjusted around a longitudinal axis of the housing. In some implementations, the housing, and all its contained components, can be mounted on a post or pole (e.g., at the top of the pole) or other structure for the purpose of positioning the broadcast communication and control field in a specific location relative to, for example, an exit or perimeter boundary of a containment area. The housing may be configured to rotate around the pole or post. In some such implementations, upon entering the containment area defined by the communication and control field established by the transmitter, the transmitted signal is received by the vehicle (e.g., via a receiver in a cart wheel) that is equipped with a battery powered radio receiver. A communication link is established between the wheel receiver and the transmitter by which the wheel can remotely receive and/or send data transmissions (e.g., the communication link can be one-way or two-way). In addition, the housing can be configured to display a sign warning customers that vehicle movement will be inhibited at this particular exit or perimeter boundary (e.g., a wheel of the vehicle may lock). In some implementations, the sign may face approximately perpendicular to the control field so that it is visible as customers push carts toward the boundary of the containment area.

In some embodiments, the power output capacity of the solar panel, the size, power, and/or field shape of the directional antenna, and/or the radio transmitter frequency may be adjustable. Many variations are possible and will be illustrated by the example embodiments that follow.

Example Solar Powered Transmitter

FIG. 1 is a perspective view that schematically illustrates an embodiment of a solar powered transmitter 100. The solar powered transmitter 100 comprises a housing 110 and a solar panel assembly 120. The housing 100 is substantially cylindrically shaped with end caps 7 and 13, and the solar panel assembly 120 is disposed near the center of an upper surface of the housing 110. In other embodiments, the housing and/or the solar panel assembly 120 can be shaped differently. For example, the housing 110 may be rectangularly shaped (or some other polygonal shape). The housing 110 can be formed from a material that is substantially transmissive to electromagnetic radiation in a desired frequency band (e.g., radio waves). The housing 110 may be formed from a substantially rigid material such as plastic.

The housing 110 may include attachment features 70 to enable the transmitter 100 to be attached or mounted to a structure such as a building. For example, the attachment features may comprise clamps, brackets, etc. that can be used to attach the transmitter to a wall or roof of the structure. In the embodiment illustrated in FIG. 1, the attachment feature 70 is configured to allow the transmitter 100 to be attached to a post or pole 170. The attachment feature 70 comprises a mount comprising a hollow tube attached to (or formed on) a lower surface of the housing 110. The mount permits the transmitter 100 to be mounted on an upper end of the pole 170, e.g., by fitting the upper end of the pole 170 into the hollow tube. In some embodiments, the fit between the pole 170 and the hollow tube allows the transmitter 100 to be rotated about the axis of the pole, e.g., in a horizontal plane for the common case where the pole 170 is vertical. In some embodiments, a lower end of the mount 70 comprises set-screws or fasteners that allow the transmitter 100 to be secured into a desired position relative to the pole 170. In some implementations, the pole 170 can be located in or near a desired containment area, and the transmitter 100 can be rotated around the pole 170 to position and/or orient the control field broadcast by the transmitter toward a desired portion of the containment area. In some implementations, the pole is sufficiently tall so that the solar panel assembly 120 can receive adequate sunlight (e.g., visible light) to power transmitter circuitry and/or rechargeable power sources. The pole may be sufficiently tall so that the solar panel assembly 120 is not shielded or shadowed by nearby trees or buildings. A further possible advantage of a sufficiently tall pole is that the transmitter 100 can broadcast a control signal to a containment area with a reduced likelihood of the signal being blocked by passing pedestrians, automobiles, trucks, etc.

Optionally, a display sign 29 can be attached or mounted to an end of the transmitter 100 (or elsewhere) and used to provide a notice or warning related to the containment system or other information (e.g., advertisements). In other embodiments, the solar powered transmitter 100 may be configured differently than shown in FIG. 1.

Example Antenna Assembly

Figure 2:
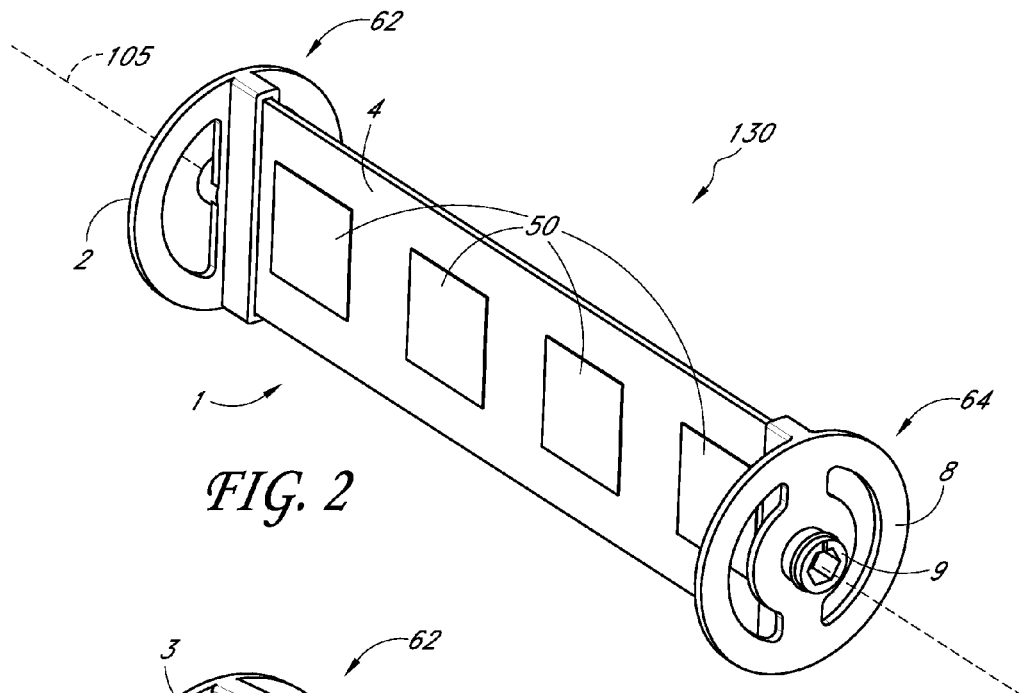
FIG. 2 is a perspective view of the solar powered transmitter with a housing removed to schematically show an embodiment of an antenna assembly disposed in the housing.
Figure 3:
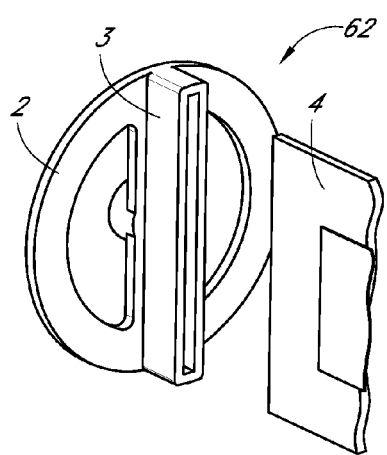
FIGS. 3-5 are perspective views of a first end of an embodiment of the antenna assembly.
Figure 4:
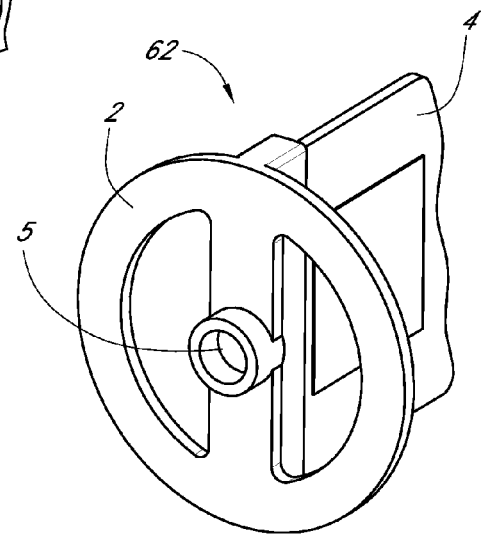
Figure 5:
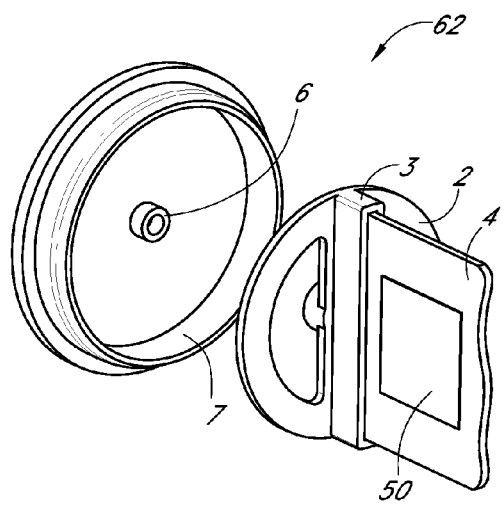

FIG. 2 is a perspective view of the solar powered transmitter 100 with the housing 110 removed to schematically show an embodiment of an antenna assembly 130 that is disposed in the housing 110. The antenna assembly 130 comprises a first end 62 and a second end 64. In the illustrated embodiment, the antenna assembly 130 comprises a directional antenna 1 attached to (or formed on) an antenna substrate 4. FIGS. 3 to 5 are perspective views that schematically show the first end 62 of the antenna assembly 130. As shown in FIGS. 2-5, attached to the first end 62 of the antenna assembly is an alignment retainer 2 comprising a slot 3 for engaging an end of the antenna substrate 4. The retainer 2 can be shaped like a circular annulus. Other shapes can be used, e.g., polygonal. The retainer 2 can have openings (as shown) to reduce weight. In other embodiments, the retainer 2 does not have openings. The size of the alignment retainer 2 (e.g., an outer diameter of the annulus) advantageously should be smaller than an inner diameter of the housing 110. The slot 3 can be arranged along a diameter of the annulus 2 and can have a width and thickness corresponding to the width and thickness of the antenna substrate 4. An edge of the antenna substrate 4 engages the slot 3, for example, by sliding into the slot. In some embodiments, the slot 3 is integrally formed with the retainer 2. In other embodiments, the antenna substrate 4 can be attached to the retainer 2 differently than shown, for example, by using fasteners.

FIG. 4 schematically shows a side of the retainer 2 that is opposite to the slot 3 and that comprises a socket 5 used to align and support the first end 62 of the retainer 2. FIG. 5 schematically illustrates an embodiment of an alignment retainer housing cap 7 that fits into an end of the housing 110. The housing cap 7 comprises a post 6 disposed on an inside surface of the cap 7. The post 6 is configured to engage the socket 5 on the retainer 2. In some embodiments, the post 6 and the socket 5 are sized so that the retainer 2 can rotate when the post 6 is inserted into the socket 5. In other embodiments, the retainer 2 is configured with a post and the cap 7 is configured with a corresponding socket. Other variations are possible. For example, in some embodiments, the retainer 2 is not used, and the antenna substrate 4 engages the housing cap 7 directly.

Figure 6:
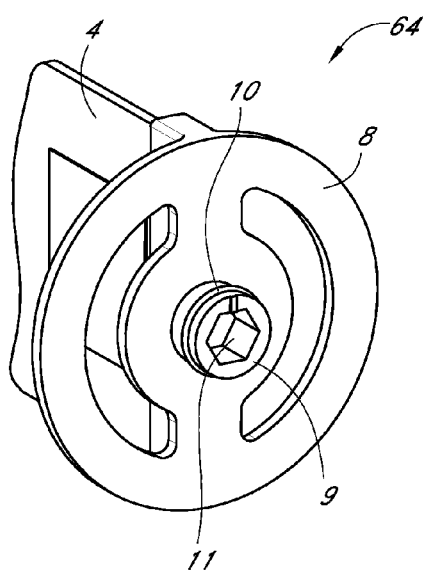
FIGS. 6 and 7 are perspective views of a second end of an embodiment of the antenna assembly.
Figure 7:
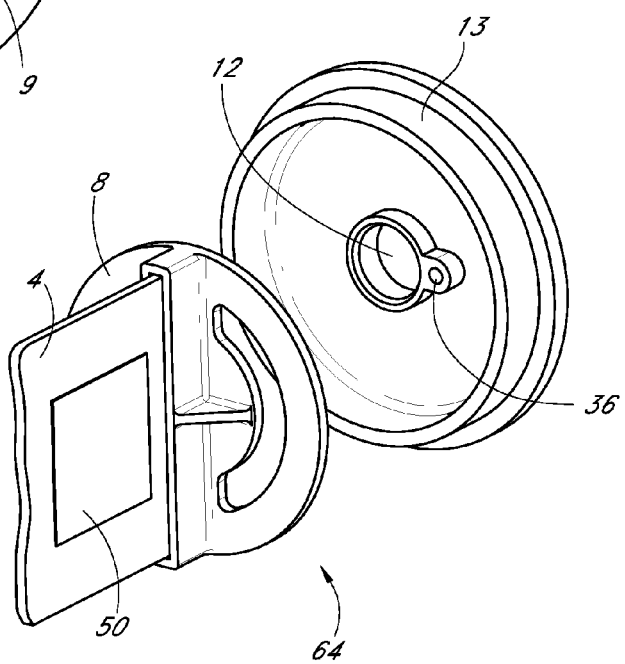

FIGS. 6 and 7 are perspective views that schematically illustrate an embodiment of the second end 64 of the antenna assembly 130. The second end 64 comprises an adjustment retainer 8 and an adjustment retainer housing cap 13. The adjustment retainer 8 comprises a slot configured to engage the second end of the antenna substrate 4. The slot may be substantially similar to the slot 3 of the retainer 2, and, in some embodiments, is integrally formed with the retainer 8. The retainer 8 may include a post 9. In some embodiments, formed into the post 9 are a groove for an o-ring 10 and a hexagonal or other geometrically shaped recess 11. The adjustment retainer housing cap 13 is configured to fit into an end of the housing 110 (opposite to the end having the alignment retainer housing cap 7). The adjustment retainer housing cap 13 comprises a hole 12. The post 9 of the adjustment retainer 8 fits through the hole 12 to support the antenna assembly 130 in the housing 110.

The retainer alignment housing cap 7 and the adjustment retainer housing cap 13 may be permanently attached to either end of the housing using an adhesive, fasteners, welds, etc. In some embodiments, at least one of the housing caps 7 and 13 is removable so that the antenna 1 can be accessed. The two housing caps 7 and 13 advantageously fit or are attached sufficiently tightly into opposite ends of the housing 110 so that the housing 110 is weatherproof, water-tight, and/or tamper-proof. When assembled, the post 9 passes into or through the hole 12 and the o-ring 10 forms a moisture proof seal with the inside diameter of the hole 12 in the adjustment retainer housing cap 13. The illustrated embodiment advantageously permits rotation of the antenna assembly 130 (and the antenna 1) along a longitudinal axis 105 of the housing 110 (see, e.g., FIG. 2). For example, the longitudinal axis 105 of the illustrated embodiment extends along a line from the post 6 and socket 5 at the first end 62 of the antenna assembly 130 to the post 9 and the hole 12 at the second end 64 of the antenna assembly 130. In the illustrated embodiment, the longitudinal axis 105 is substantially collinear with a central axis of the cylindrically-shaped housing 110. In other embodiments, the longitudinal axis 105 can be displaced from the central axis of the housing.

The antenna assembly 130 can be rotated within the housing 110 using a tool having a distal end having a shape corresponding to the shape of the recess 11. For example, the distal end of the tool (e.g., a hex key or Allen wrench) can be inserted in the recess 11 so as to rotate the post 9, and thereby rotate the antenna 1, in a clockwise or counter-clockwise direction. The range of angular rotation may be a full 360 degrees in some embodiments. In other embodiments, the angular rotation range may be less than 360 degrees, e.g., 180 degrees, 90 degrees, 45 degrees, 30 degrees, 20 degrees, or less. In some embodiments, the housing caps 7 and/or 13 may include features (e.g., posts) that impede rotation of the assembly 130 beyond a desired angular range.

In response to the rotation of the post 9, the first end 62 of the antenna assembly 130 also may rotate (e.g., the post 6 rotates in the recess 5), which advantageously reduces twisting and/or torquing of the antenna 1. Accordingly, the angular orientation of the antenna 1 in the housing 110 may be manually adjusted. Additionally, the frictional fit of the o-ring 10 in the hole 12 holds the antenna 1 in the desired orientation obtained after adjustment. The frictional fit of the o-ring 10 also helps keep the housing 110 weatherproof and watertight. In some embodiments, the cap 13 may include a hole 36 for a set-screw. The set-screw can be screwed through the hole 36 until the distal end of the set-screw engages the surface of the retainer 8, thereby further inhibiting the antenna 1 from moving from the desired angular orientation in the housing 110 (see also Fig. *).

In other embodiments, the housing 110 and/or the antenna assembly 130 may be configured differently than shown in FIGS. 1-7. For example, instead of the post 9 and recess 11, a knob or other turning mechanism may be provided to permit rotation of the antenna 1. In some embodiments, the turning mechanism is configured so that the antenna assembly can be rotated without opening the housing 110.

Example Directional Antenna

An example of a directional antenna 1 for the solar powered transmitter is shown in FIG. 2. The antenna 1 can comprise a single element or an array of elements. For example, the antenna 1 can comprise a patch antenna array with one or more elements 50 formed on (or attached to) the antenna substrate 4. In some embodiments, the antenna can comprise a phased array of antennas. In some such embodiments, the phased array may be configured to provide dynamic beamforming of the antenna pattern.

The antenna substrate 4 may comprise a printed circuit board material such as, e.g., Arlon 25N. In the illustrated embodiment, four elements 50 are used, although this is not a limitation, and different numbers of elements 50 are used in other embodiments. The antenna can be configured to operate at radio frequencies such as, for example, between about 1 MHz and 300 GHz. In some cases, the antenna is configured to operate at about 2.4 GHz. Other frequencies are possible, e.g., frequencies in the ultra high frequency (UHF) band, super high frequency (SHF) band, or in any of the industrial, scientific, and medical (ISM) radio bands. For example, a 5.8 GHz frequency can be used.

Figure 8A:
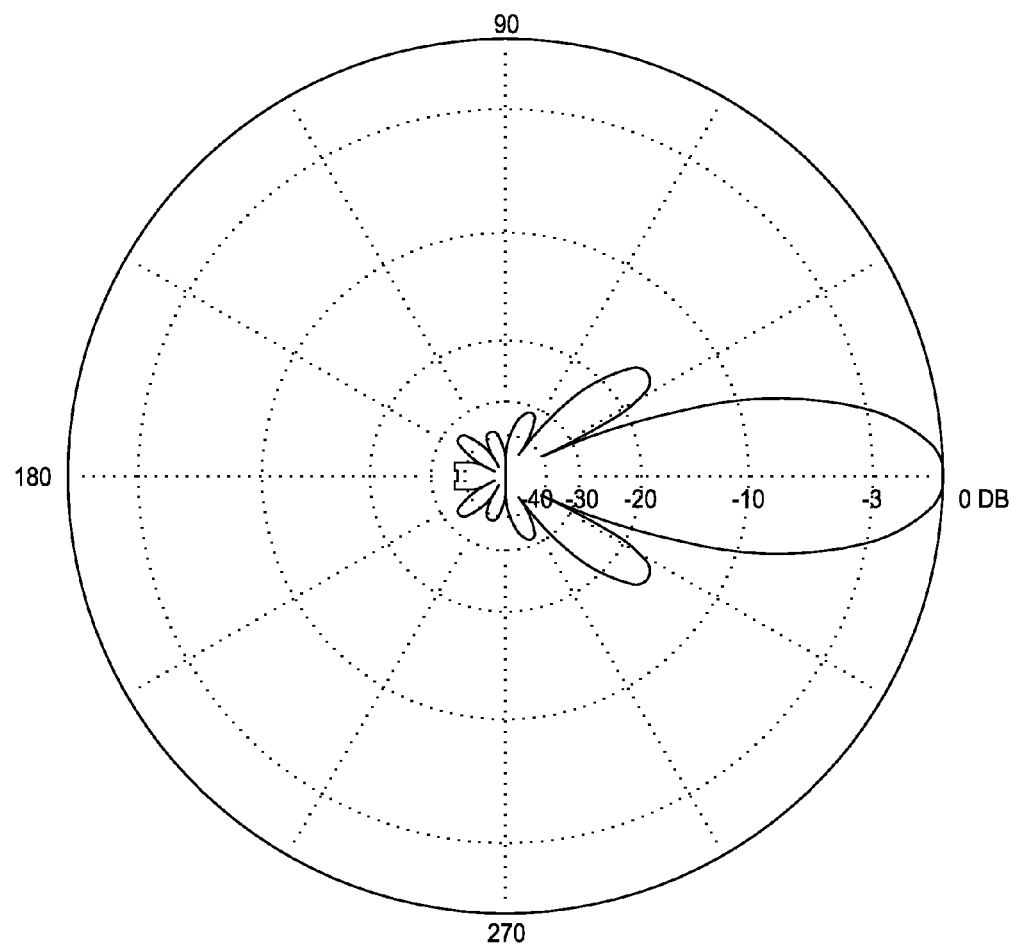
FIGS. 8A-8C illustrate 2.4 GHz radiation patterns for three example antenna arrays having four elements formed on an Arlon 25N substrate but having different physical dimensions: 4×12 inch (FIG. 8A), 3×10 inch (FIG. 8B), and 3×8 inch (FIG. 8C).
Figure 8B:
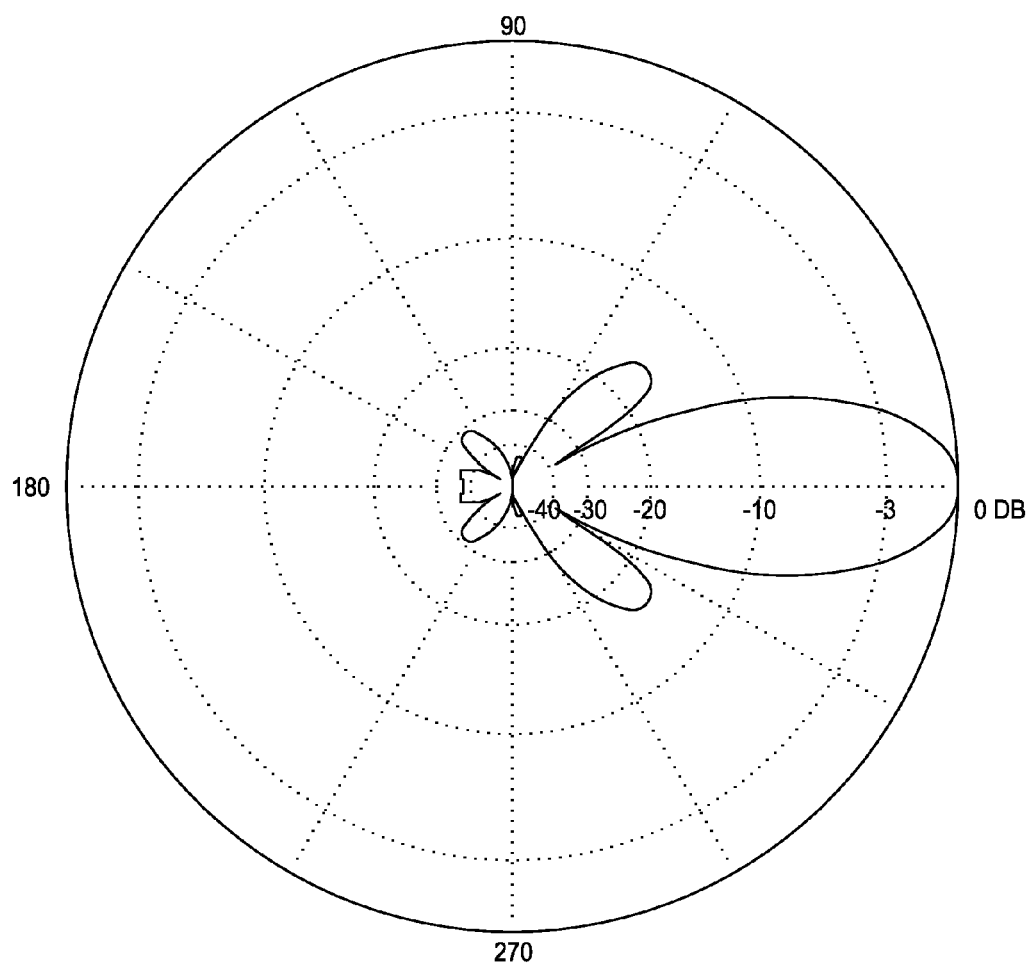
Figure 8C:
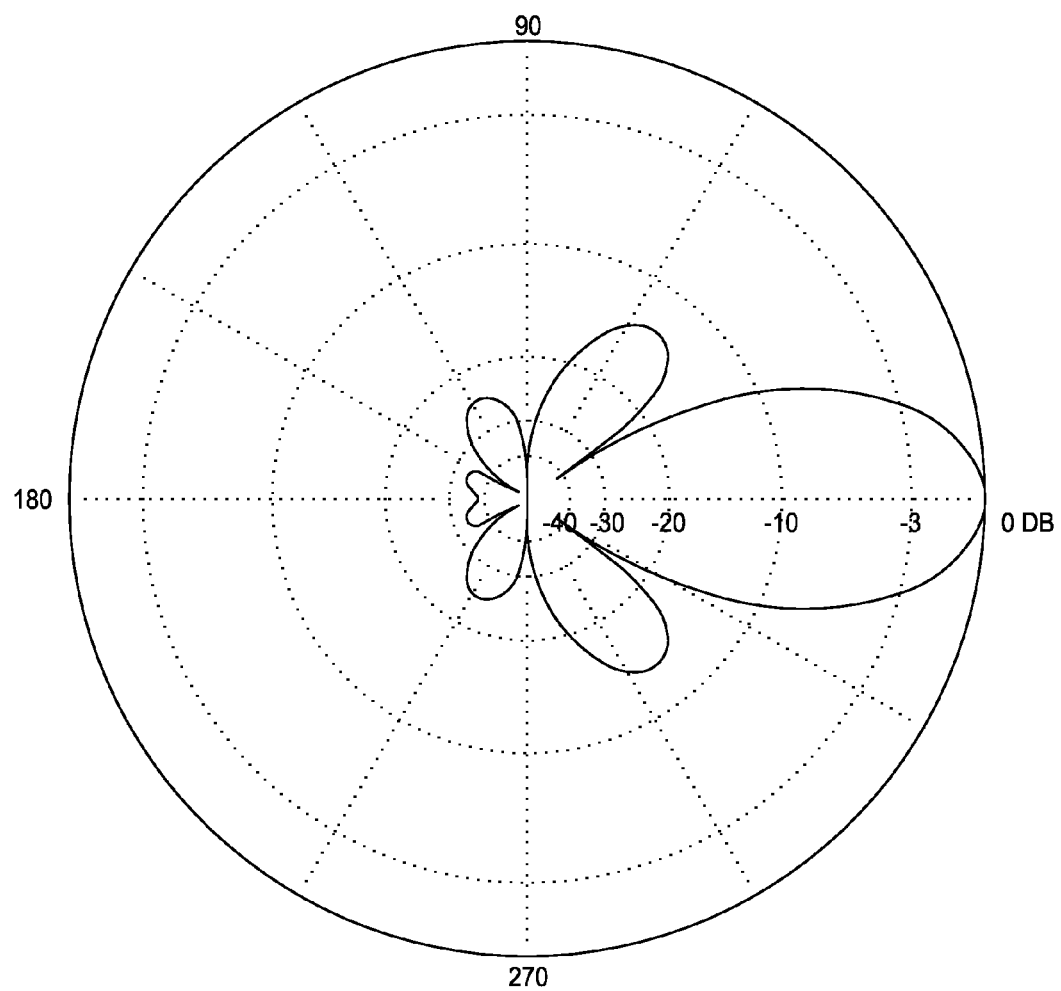

In various embodiments, the antenna 1 is rectangularly shaped with dimensions including, e.g., 3 inches by 8 inches, 3 inches by 10 inches, 3 inches by 11 inches, 4 inches by 12 inches. With reference to FIGS. 2-7, edges of the antenna (or antenna substrate) having the shorter dimension can be disposed in the slots in the end caps 2 and 8. Other shapes and/or dimensions may be used. Embodiments of the antenna can be configured to have a desired radiation pattern, beam width, beam height, reduced side lobes and/or back lobes, and so forth. FIGS. 8A-8C illustrate 2.4 GHz radiation patterns for three example antenna arrays having four elements formed on an Arlon 25N substrate but having different physical dimensions: 4×12 inch (FIG. 8A), 3×10 inch (FIG. 8B), and 3×8 inch (FIG. 8C).

The 3 dB beam widths of the main lobe of these three example antennas are: 20 degrees (FIG. 8A), 24 degrees (FIG. 8B), and 30 degrees (FIG. 8C). In one embodiment, the antenna is 3 inches by 11 inches and configured to have reduced side lobes, low or negligible back lobes, a narrow horizontal field, and a wide vertical field. In some embodiments, the sidelobes are at least 10 dB lower than the main lobe and the backlobes are at least 30 dB lower than the main lobe (see, e.g., the radiation patterns in FIGS. 8A-8C). In some embodiments, the horizontal field of the antenna is less than about 24 degrees. In some embodiments, the vertical field of the antenna is greater than about 45 degrees. Other antenna configurations and radiation patterns are possible.

Example Solar Panel Assembly

Figure 9:
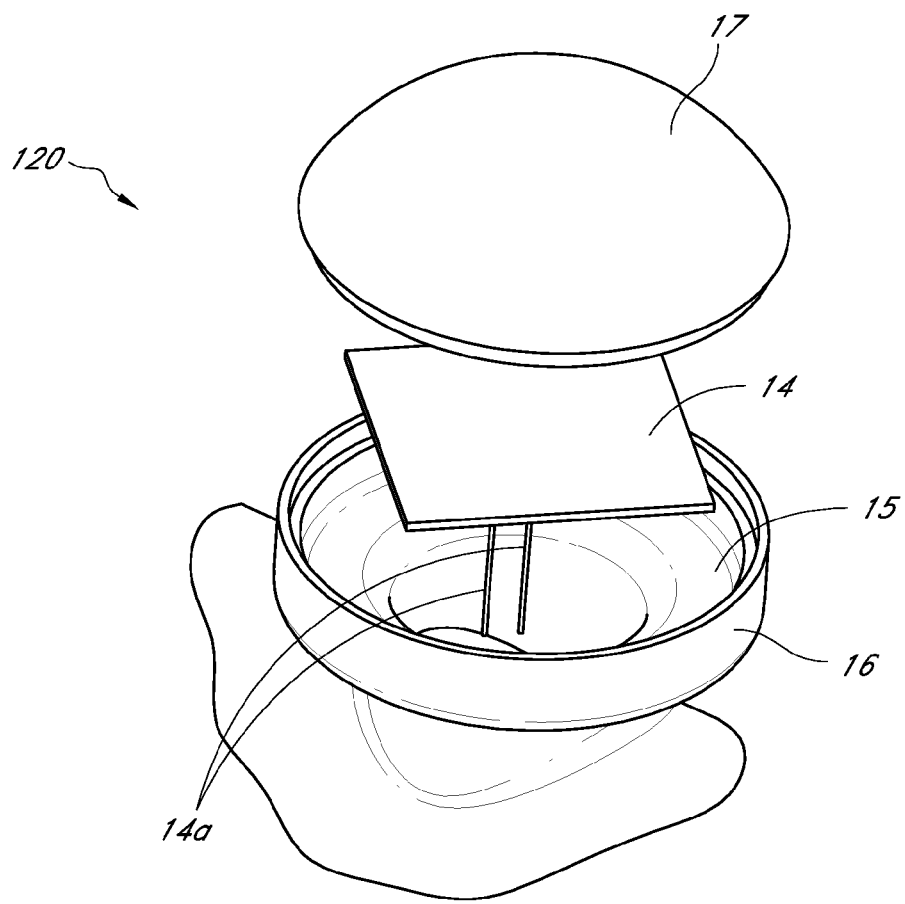
FIG. 9 is an exploded view of an embodiment of a solar panel assembly disposed at an upper surface of the housing of a solar powered transmitter.

An embodiment of the solar panel assembly 120 is schematically shown in an exploded view in FIG. 9. In this embodiment, the solar panel assembly 120 comprises a solar panel 14 that is mounted in a recess 15 at the top of a solar panel housing 16. The solar panel 14 may comprise one or more photovoltaic (PV) cells or arrays. The one or more PV cells can be electrically connected in series and/or parallel to provide the solar panel 14 with desired electrical characteristics, e.g., peak voltage, current, power, etc. Any suitable type of PV cell or array may be used including, e.g., silicon wafers, thin film devices, multi-layer devices, nanocrystalline cells, etc. Electrical connections 14a for the solar panel 14 may pass through an opening in the recess 15 and be connected to suitable circuitry (described below).

Disposed over the solar panel 14 is an optical element that is transparent (or translucent) to sunlight (e.g., visible light). The optical element can comprise a lens 17. The lens 17 can comprise a Fresnel lens. The optical element can comprise a refractive or diffractive optical element. In the illustrated embodiments, the lens 17 is attached to the top of the solar panel housing 16. The optical properties of the lens 17 may be selected, for example, to provide a wide acceptance angle for rays of the sun (or other light sources). In one embodiment, the lens 17 is semi-spherical. Other lens shapes may be used. The lens 17 may be shaped to focus or converge light (e.g., sunlight) onto the solar panel 14 (e.g., the lens may have optical power). In some embodiments, the lens 17 has negligible optical power (e.g., is a plate or sheet). The lens 17 may be permanently or removably affixed to the solar panel housing 16. Advantageously, the lens and housing can be weather proof to protect the solar panel 14 from the elements. In some embodiments, the lens 17 is formed from a rigid, transparent material such as plastic or glass. The solar panel housing 16 may also be formed from a substantially rigid material such as plastic.

In other embodiments, the solar panel 14 may be physically separate from the housing 17. For example, the solar panel 14 may be a separate unit that is electrically connected to the electronics in the housing 16.

Example Electronics and Battery Assembly

Figure 10:
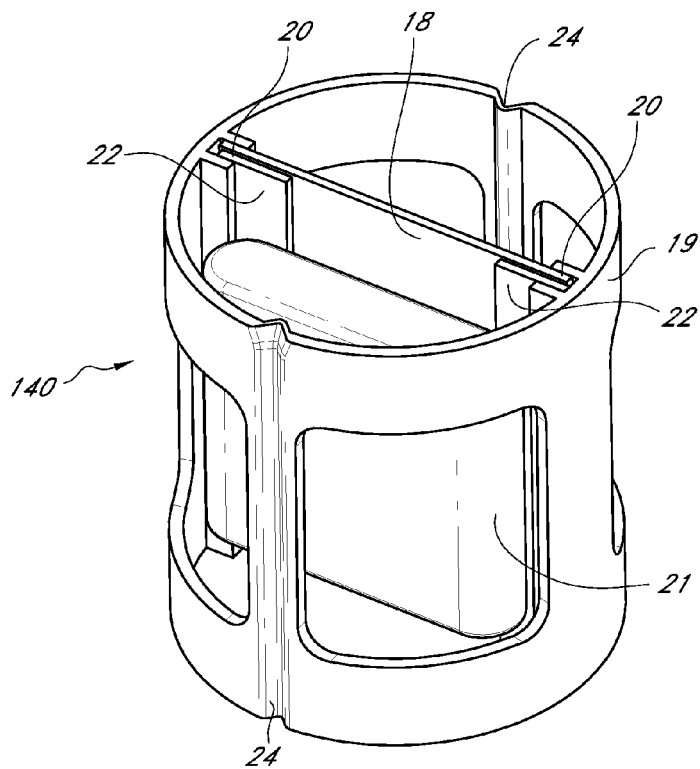
FIGS. 10 and 11 are perspective views schematically showing an embodiment of an electronics and battery source assembly for the solar powered transmitter.
Figure 11:
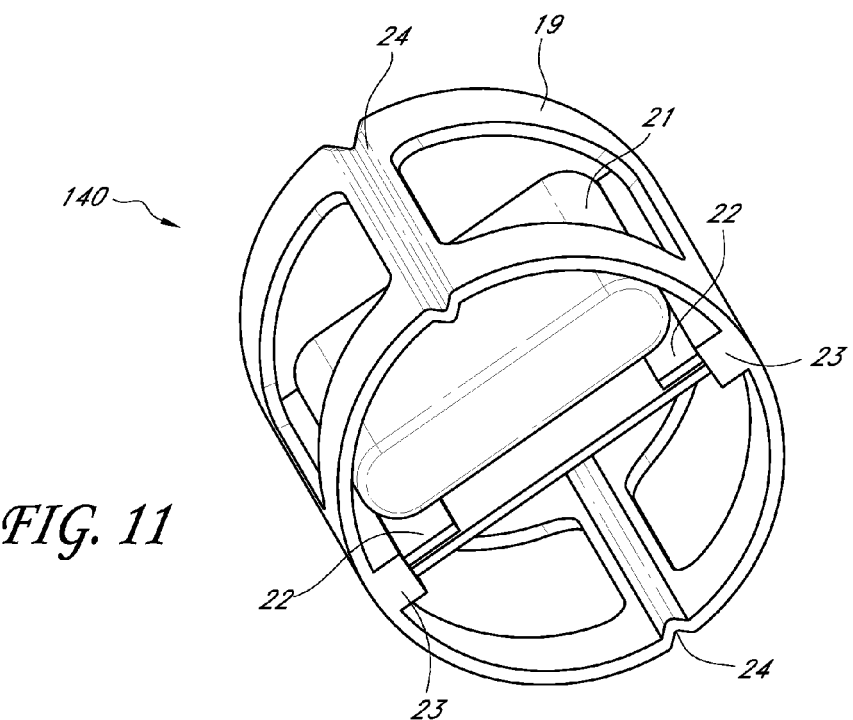

FIGS. 10 and 11 schematically show views of an embodiment of electronic circuitry and a battery assembly 140 for the solar powered transmitter 100. The electronics and battery assembly 140 comprises a printed circuit board retainer 19 that holds a printed circuit board assembly 18 for the electronics. The printed circuit board retainer 19 can be formed as a single-piece molded plastic unit, having a pair of opposed slots, 20, between which the printed circuit board 18 is disposed. In other embodiments, the circuit board retainer 19 can be formed from multiple pieces. A battery pack 21 is attached to a battery pack retainer plate 22, which in this embodiments is a flat plastic plate. The battery pack 21 can be attached by any suitable technique such as with fasteners, adhesive, etc. In some embodiments, the battery pack is removably attached to the retainer plate 22, e.g., using a strip of hook-and-loop material (e.g., VELCRO) on the back surface of the battery pack. This retainer plate 22 can be inserted into the retainer 19 such that opposing edges of the retainer plate 22 are engaged in the opposing slots 20 in the printed circuit board retainer 19.

In the illustrated embodiment, the printed circuit board 18 and the battery pack retainer plate 22 are retained in the slots 20 in the printed circuit board retainer 19, because the slots 20 have a closed bottom 23, thereby preventing the printed circuit board 18 and battery retainer plate 22 from sliding out of the printed circuit board retainer 19. In other embodiments, the electronics and battery pack assembly can be retained in the slots 20 via friction between the slots and the edges of the retainer plate 22. In other embodiments, the battery pack 21 is attached separately from the printed circuit board 18 (e.g., using a different set of slots or other types of fasteners).

Figure 12:
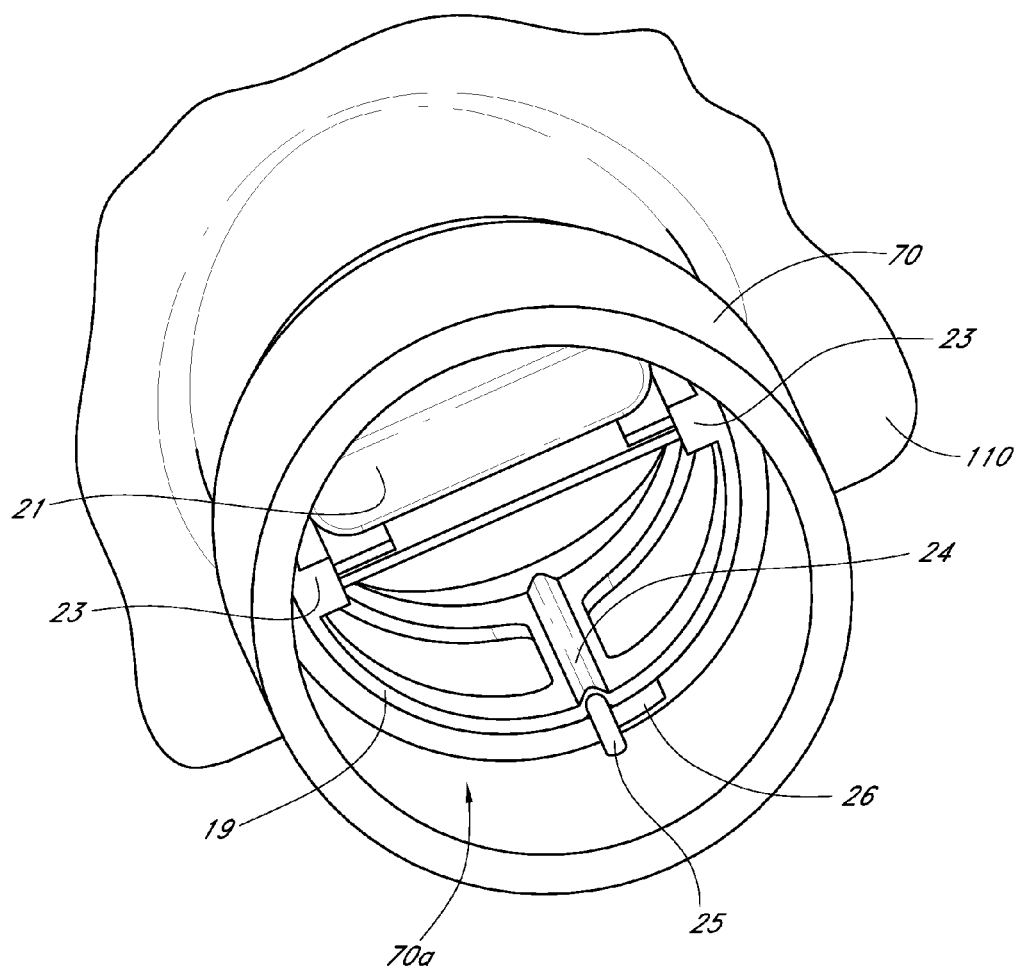
FIG. 12 schematically shows an embodiment of an electronics and battery assembly inserted into a recess in a hollow attachment feature disposed at a lower surface of the housing of an embodiment of a solar powered transmitter.

FIG. 12 schematically shows the electronics and battery assembly 140 inserted into a recess 70a in the hollow attachment feature 70 disposed at the lower surface of the housing 110. The inner surface of the attachment feature 70 comprises two protrusions or teeth 25 configured to engage two slots 24 located on opposite sides of the printed circuit board retainer 19 so as to secure and orient the electronics and battery assembly 140 in the attachment feature 70. In other embodiments, a different number of slots 24 and/or teeth 25 can be used.

The teeth 25 can be molded into the inside surface of the attachment feature 70. When the electronics and battery assembly 140 is inserted into the recess 70a of the attachment feature 70, each tooth 25 engages the corresponding slot 24, which tends to align and orient the printed circuit board retainer 19, as well as to keep it in place and keep it from falling out of the recess 70a. In the illustrated embodiment, a depression 25a is molded into the inside surface of the attachment feature 70 adjacent the tooth 25. The depression 25a allows a screw driver, or similar tool, to be inserted into the depression 25a and used to pry the outer side of the printed circuit board retainer 19 over the tooth, 25, in order to remove the retainer 19 from the recess 70a. In other embodiments, the depression 26 is not used. In the illustrated embodiment, to access the electronics and battery assembly 140, the transmitter 100 is detached from the pole, which allows access to the assembly 140 disposed in the recess 70a in the hollow attachment feature 70.

In some embodiments, the slots 24 and the teeth 25 are not used, and the retainer 19 is held in the attachment feature 70 via frictional engagement between the outer surface of the retainer 19 and the inner surface of the attachment feature 70. In other embodiments, the attachment feature 70 and/or the retainer 19 may be shaped differently. For example, one or both may be shaped as polygons (e.g., rectangles) rather than cylinders as shown in the illustrations. In other embodiments, the battery pack 21 is not disposed adjacent the printed circuit board 18 and is located elsewhere in the housing 110. In some embodiments, the electronics and battery assembly 140 is disposed in the solar panel housing 16 (e.g., below the solar panel 14). Many variations are possible.

The electronic components in the transmitter 100 are electrically connected to the printed circuit board 18 and/or the battery pack 21, e.g., via wires (not shown). The antenna 1 can also be electrically connected to the printed circuit board 18 and/or the battery pack 21.

Example Adjustable Display Sign Assembly

Figure 13:
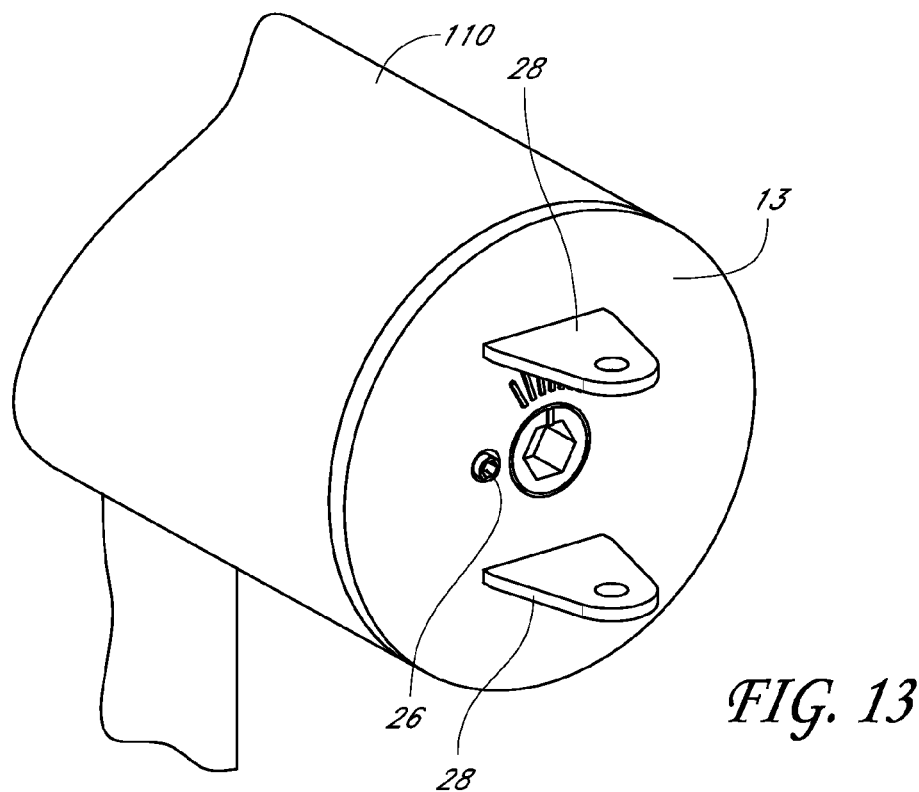
FIGS. 13-16 schematically illustrate embodiments for connecting a display sign to an embodiment of a solar powered transmitter.
Figure 14:
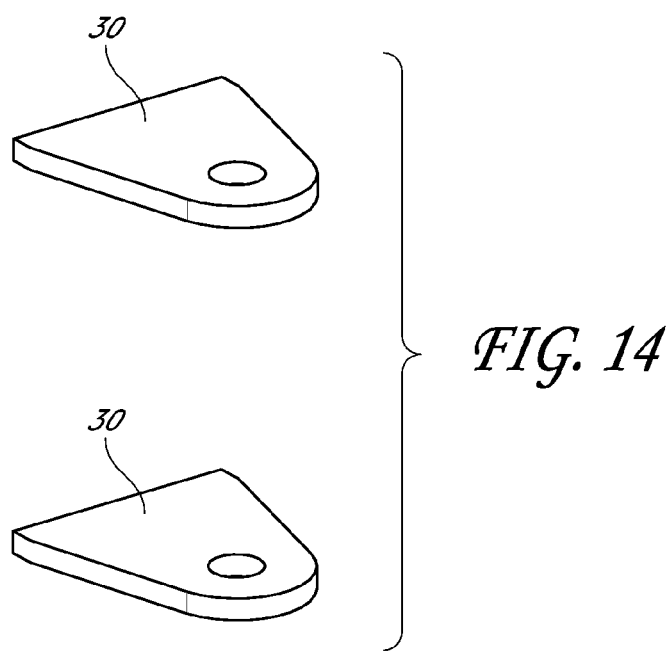

In some embodiments, an optional display sign 29 is attached or mounted to the solar powered transmitter 100. FIGS. 13-16 schematically illustrate one possible example of the connection of the sign 29 to the transmitter 100. With reference to FIG. 13, the adjustment retainer housing cap 13 comprises two tabs 28 that form a bracket for mounting the display sign 29. In some embodiment, the tabs 28 are formed from metal over-molded with the plastic resin material that forms the body of the cap 13. Two mating tabs 30 (FIG. 14) generally similar in shape and size to the tabs 28 can be molded as part of the sign 29. As shown in FIG. 16, the sign 29 can be attached to the housing cap 13 by a mounting bolt or pin 33 that passes through openings in the tabs 28 and the tabs 30. The sign 29 can be rotated about the axis of the mounting bolt 33 through an angle of rotation that depends on factors such as the length of the tabs 28, 30, the transverse size of the housing cap 13, etc. In some embodiments, the sign 29 can be rotated from a position in which the face of the sign is perpendicular to the longitudinal axis of the housing 110 to positions 45 degrees clockwise or counter-clockwise from the perpendicular position (e.g., the angle of rotation is ±45 degrees). In other embodiments, the angle of rotation may be different, e.g., ±30 degrees, ±15 degrees, ±60 degrees, or a different angle. When the sign 29 is in a desired angular orientation relative to the housing 110, the sign 29 can be held in place, e.g., by securing a locking nut on the bolt 33.

Figure 15:
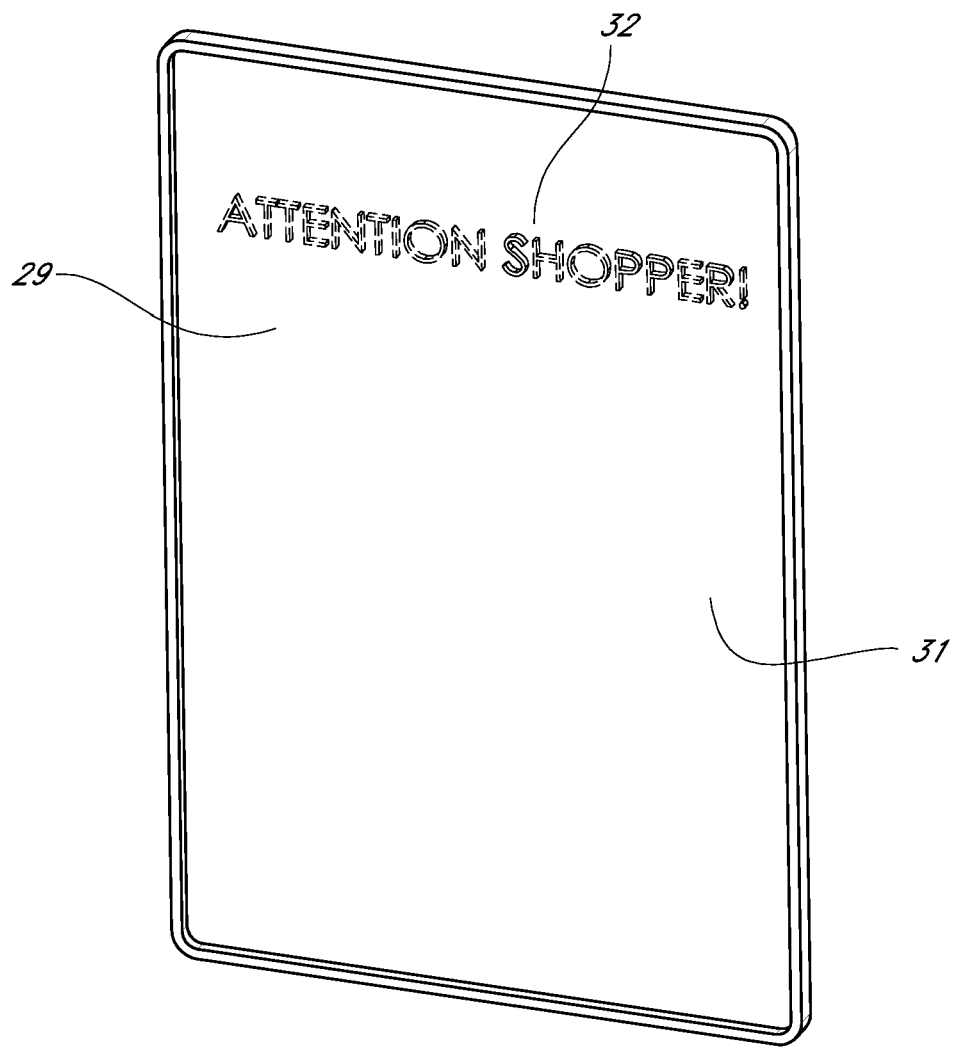
Figure 16:
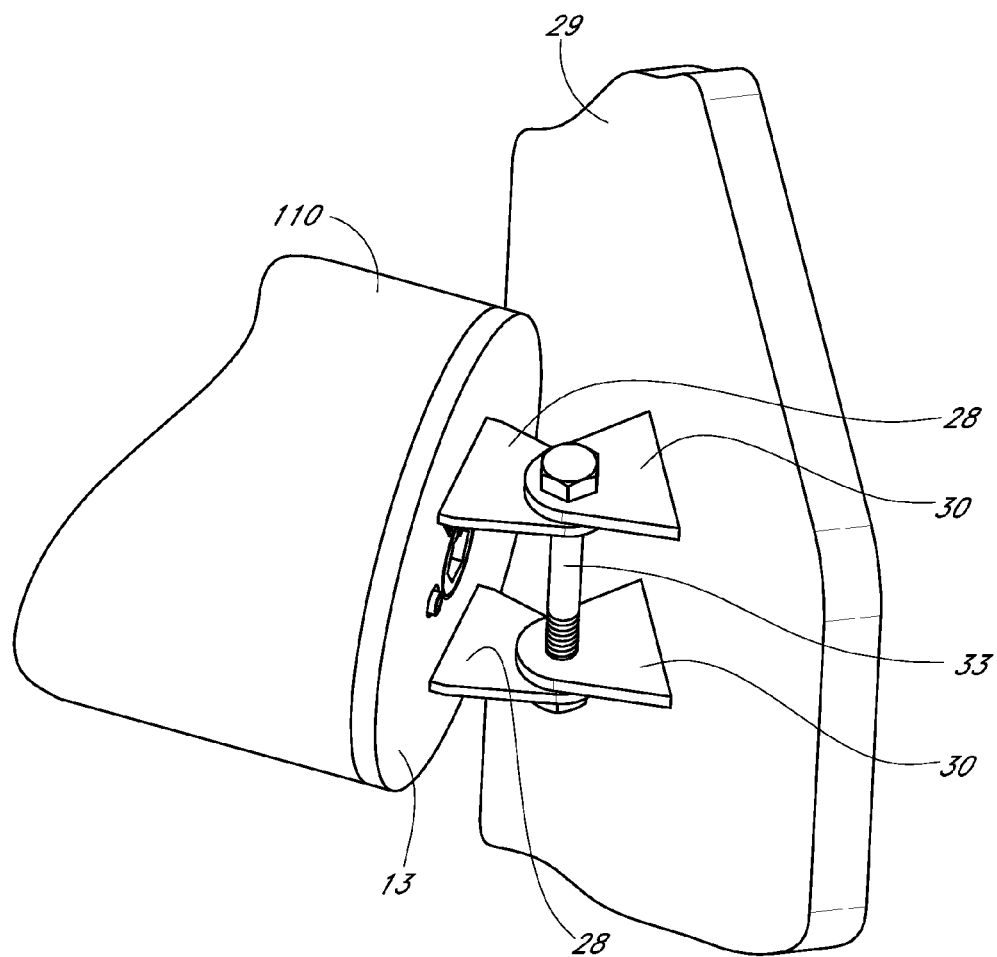

With reference to FIG. 15, the front 31 of the sign 29 may be flat or curved, may be of any suitable shape (e.g., rectangular), and can be used to display a label 32 for advertising, warnings, notifications, or other purposes. The label 32 may be attached to the sign via adhesives in some implementations.

Figure 17:
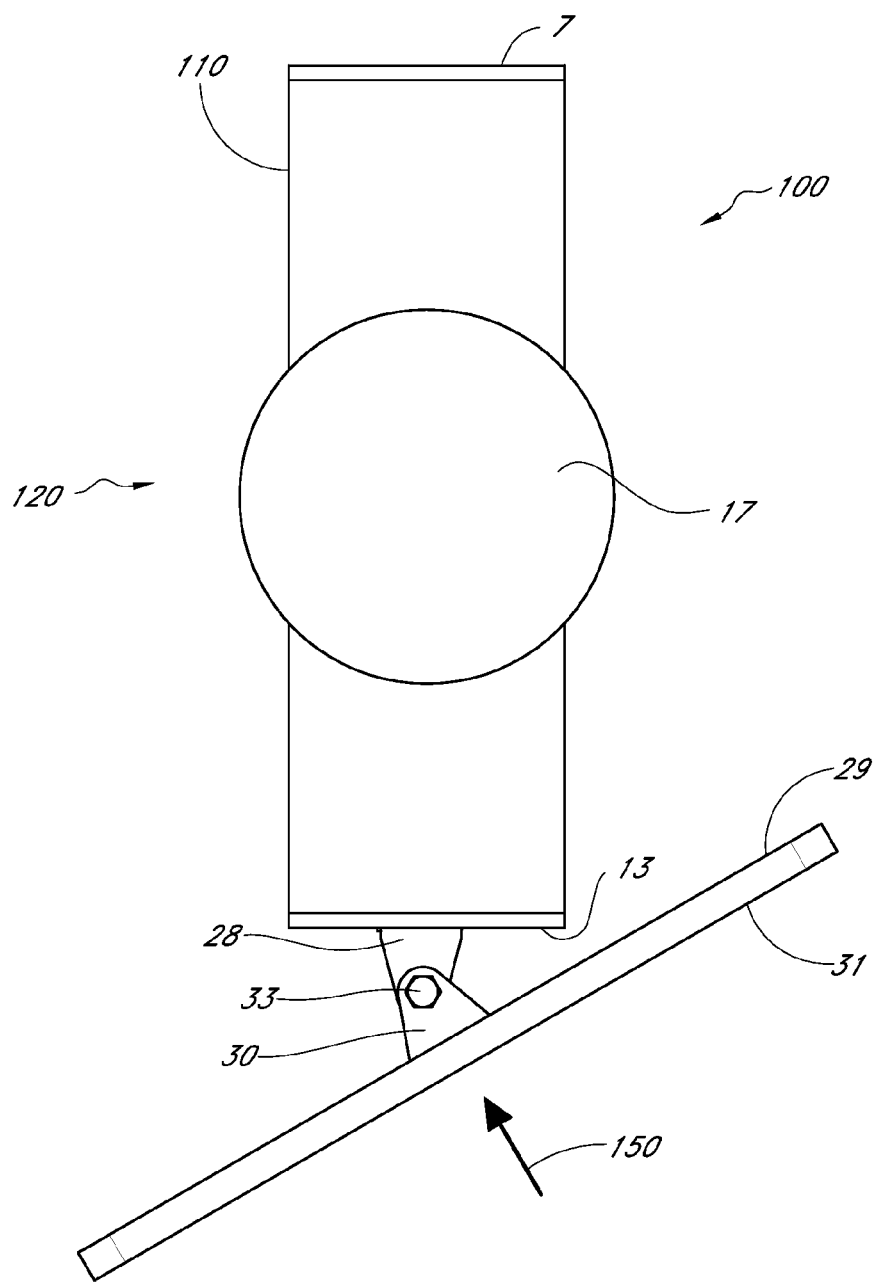
FIG. 17 is a top view of an embodiment of a solar powered transmitter having a display sign.

As schematically illustrated in FIG. 17, an advantage of embodiments having an adjustable display sign 29 is that the display information 32 on the sign can be oriented to face toward an expected direction 150 of an oncoming person (e.g., a customer pushing a cart) as the person approaches the control field broadcast by the solar powered transmitter 100. Also, in some implementations, to properly locate the control field, the transmitter 100 can be rotated about the pole or post on which the transmitter is mounted. In some such implementations, the face 31 of the sign 29 can be suitably oriented relative to the direction 150 of oncoming person pushing carts toward the control field.

In other embodiments, the display sign 29 is permanently oriented at a desired angle relative to the housing 110 (e.g., the sign is not angularly adjustable). In other embodiments, the sign 29 can be adjustably attached to the housing 16 differently than shown above. For example, a different number and/or arrangement of tabs may be used. In other cases, a ball and socket joint is used, which may allow the sign 29 to be adjusted in two or more directions (e.g., horizontally and vertically). In other embodiments, the display sign 29 is not used or is attached to the pole on which the transmitter can be mounted. Many variations are possible.

Example Methods for Installation & Adjustment of the Transmitter

With reference to FIGS. 19A and 19B, in one, non-limiting, example installation method, the transmitter 100 can be installed by rotatably mounting the attachment feature 70 at the top of and coaxially with a pole or post 170 having an outer diameter matching an inside diameter of a recess in the attachment feature 70. The pole or post 170 has a mounting axis 200. In many implementations, the pole or post 170 is mounted vertically with respect to a surface (e.g., the ground, the surface of a parking lot); therefore, the mounting axis 200 will be vertical in such implementations (e.g., substantially perpendicular to the surface). In other implementations, the pole or post 170 can be mounted differently, e.g., secured to a wall and extending outwards from the wall at an angle. In such implementations, the mounting axis 200 may not be vertical.

In an example installation in which the pole 170 (and the axis 200) is vertical, the horizontal orientation of the broadcast signal comprising the control field can be adjusted by rotating the transmitter 100 around the axis 200 of the post or pole prior to securing the transmitter in its desired position and/or orientation. In FIG. 19A, rotation of the transmitter 100 in this first plane (e.g., the horizontal plane) around the mounting axis 200 is schematically depicted by arrow 205. Once the transmitter 100 is suitably oriented in the around the axis 200, the transmitter 100 can be secured by using set screws or clamps to secure the attachment feature 70 to the pole 170.

With reference to FIG. 19B, the orientation of the signal comprising the control field 220 can be adjusted in a direction 210 around the longitudinal axis 105 of the transmitter 100 by rotating the antenna 1 around the longitudinal axis 105 of the housing 110. Accordingly, embodiments of the solar powered transmitter 100 can be configured to be adjusted about two axes, e.g., the mounting axis 200 and the longitudinal axis 105 of the transmitter 100. In some embodiments, the mounting axis 200 and the longitudinal axis 105 are not substantially parallel so that there is a non-zero angle between the axes 200 and 105. In the embodiment shown in FIGS. 19A and 19B, the mounting axis 200 and the longitudinal axis 105 are substantially perpendicular (e.g., the angle is approximately 90 degrees). In other embodiments, the axes 200 and 105 can be non-perpendicular (and/or non-parallel). For example, in some embodiments, the attachment feature 70 does not extend substantially perpendicularly from the housing 110, and in such embodiments the angle between the mounting axis 200 and the longitudinal axis 105 is non-perpendicular (e.g., the angle is not approximately 90 degrees).

Figure 18:
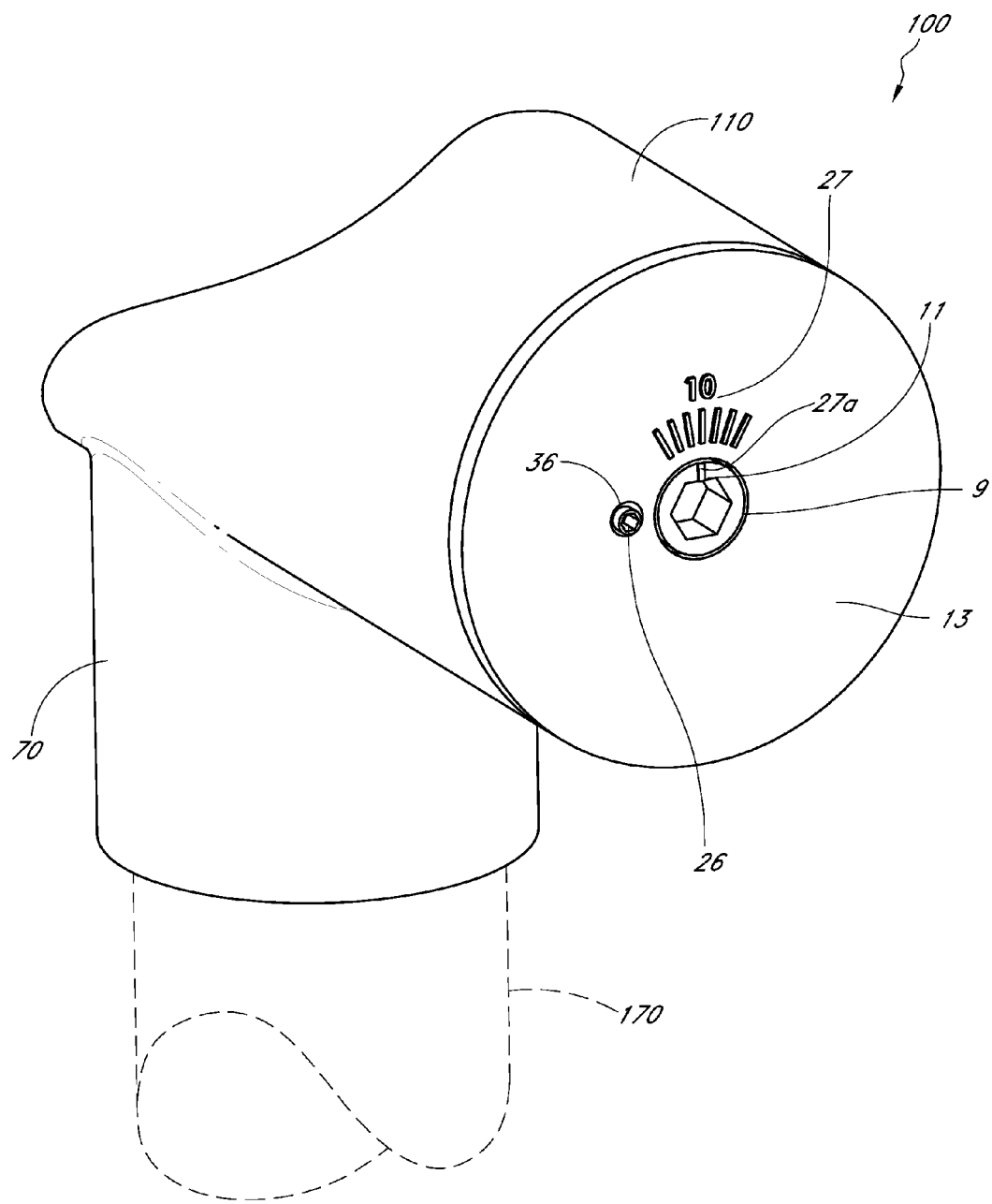
FIG. 18 is a perspective view schematically illustrating an end of the housing of an embodiment of a solar powered transmitter in which the antenna assembly can be rotated around a longitudinal axis of the housing.

In some of the embodiments illustrated herein, the angular adjustment of the antenna 1 around the longitudinal axis 105 can be performed according to the following example procedure described with reference to FIGS. 18 and 19B. The set-screw 26 (which passes through the hole 36 in the housing cap 13 shown in FIG. 7) is at least partially unscrewed, which permits the enclosed antenna assembly 130 to rotate within the housing 110. A tool with a distal end corresponding in shape to the recess 11 (e.g., a hex key or an Allen wrench) is inserted into the recess 11 in the post 9 on the adjustment retainer 8. The antenna assembly 130 can then be rotated in either a clockwise or counter-clockwise direction to adjust the angular position of the antenna 1 around the longitudinal axis 105. By suitably adjusting the angular orientation of the antenna 1, the size of the control field 220 on the surface on which the pole 170 is mounted can be adjusted. The dashed lines 220 schematically showing the control field 220 in FIG. 19 B are intended to be illustrative of one possible control field and are not intended to limit the shape and/or size of possible control fields 220 that can be transmitted by embodiments of the solar powered transmitter 100.

In some embodiments, fiducial marks 27 are provided on the face of the housing cap 13 to aid in angular adjustment of the antenna 1. In some cases, one or more fiducial marks 27a are provided in the post 9 to represent the orientation of the antenna 1 inside the housing 110. In some embodiments, the fiducial marks 27 and/or 27a are molded into the material (e.g., plastic) comprising the housing cap 13 and post 9, respectively. In the embodiment shown in FIG. 18, the fiducial marks 27 comprise 10 degree indicator marks and a numeral "10" is provided to alert a user to the angular separation between adjacent marks. Other types of fiducial marks 27, 27a can be used in other embodiments or the fiducial marks not used at all. After the desired angular adjustment of the antenna 1 is made, the set screw 26 is returned to its original position to inhibit inadvertent movement of the antenna 1 within the housing 110.

In other implementations, the transmitter 100 can be mounted to a pole, post, or structure differently than described above. For example, the end of the transmitter 100 opposite to the housing cap 13 can have mounting tabs generally similar to the tabs 28 for mounting the sign 29 to the housing 110. Corresponding mounting tabs can be attached to a surface of a structure (e.g., a wall of a building), and the transmitter can be mounted to the structure with a bolt or pin (similarly as described for the sign 29; see, e.g., FIG. 16). The transmitter can be rotated about to a desired position around an axis defined by the bolt or pin and then secured into place (e.g., with a locking nut on the bolt). In some such implementations, the hollow attachment feature 70 is not used on the lower surface of the housing 110. Other mounting variations are possible.

Additionally, the transmitter 100 need not be mounted with the longitudinal axis 105 of the housing 110 in a horizontal plane as described above. As one possible example, the transmitter 100 can be rotatably mounted so that the housing 110 can rotate in a first plane (which need not be horizontal). The antenna assembly 130 can be angularly adjusted about the longitudinal axis 105 of the housing 110. By rotating the housing 110 in a first plane (e.g., about a first axis) and rotating the antenna about a second axis (e.g., the longitudinal axis of the housing), the control field broadcast by the transmitter can be selected to have a suitable shape, size, and configuration in a containment area.

The printed circuit board 18 may include a secondary receiver configured to receive information for an initial set-up procedure and/or for operation of the antenna and radio transmitter. In some embodiments, the radio transmitter comprises a transceiver that can transmit and receive signals. In such embodiments, the secondary receiver may not be needed. The secondary receiver (and/or transceiver) can be contacted via a wireless transmission link and instructed to begin the initial set-up procedure. As part of the set-up procedure, the radio transmitter and/or antenna are adjusted for signal strength and/or intensity. In addition, a series of diagnostic checks may be completed, and then the transmitter is activated for use. The set-up procedure can be re-run from time to time to reset and/or update the broadcast configuration of the transmitter.

Example Operation of an Embodiment of a Solar Powered Transmitter

The following non-limiting example describes one possible method to operate an embodiment of the solar powered transmitter 100. In this example, the transmitter 100 is mounted on a pole or other structure in a desired location such as, for example, near an exit to a retail store, an exit to a parking lot, a containment region, etc. The transmitter advantageously may be mounted in a position such that the solar panel 14 can receive sunlight throughout the year. The transmitter 100 may be mounted sufficiently above the ground to deter theft, damage, and/or re-adjustment by unauthorized persons.

With reference to FIG. 9, the solar panel 14 mounted in the housing 16 under the lens 17 is exposed to light (e.g., sunlight) and thereby generates electric power for the transmitter 100. The electric power is transmitted via components in the printed circuit board 18 to a power storage medium (e.g., the battery pack 21), in which the electric power can be stored. The stored electric power can be used for electric components in the device (e.g., the antenna 1, the radio transmitter, and circuitry on the printed circuit board 18) and advantageously allows the transmitter 100 to operate in low-light conditions (e.g., night).

The power storage medium (e.g., the battery pack 21) can include one or more rechargeable power sources such as, for example, rechargeable nickel-metal-hydride batteries. Other battery chemistries may be used, e.g., rechargeable alkaline, nickel cadmium, lithium ion, etc. Additionally or alternatively to batteries, the power storage medium may include other rechargeable power sources such as, e.g., capacitors, ultracapacitors, supercapacitors, fuel cells, etc. Therefore, in some embodiments, the battery pack 21 may comprise rechargeable power sources other than batteries. In some embodiments, the power storage medium can include non-rechargeable power sources (e.g., non-rechargeable batteries). In some embodiments, the electronic circuitry of the transmitter is configured so that electric current provided by the solar panel 14 that is in excess of the amount required to recharge the rechargeable power source in the battery pack 21 is available for use in powering on-board electrical components, e.g., the antenna, the radio transmitter, etc. In some embodiments, the electronic circuitry comprises a controller that is configured to control operation of the transmitter (e.g., control the radio transmitter, control the recharging of the power storage medium, etc.). In some embodiments, the controller is disposed on (or electrically coupled to) the printed circuit board 18. The controller can comprise one or more microcontrollers, microprocessors, application specific integrated circuits, field-programmable gate arrays, and so forth. The controller may be configured to execute software, hardware, and/or firmware instructions to control operation of the transmitter.

In certain embodiments, the power storage medium (e.g., the battery pack 21) can be used to provide substantially continuous power to the printed circuit board 18 and a radio transmitter (or transceiver). The radio transmitter can be located on, or electrically connected to, the printed circuit board. In some embodiments, the radio transmitter communicates a 2.4 GHz electromagnetic signal. Other radio frequencies can be used. The radio transmitter broadcasts the signal via the directional antenna 1 with a specific range, shape, and/or intensity (see, e.g., the radiation patterns shown in FIGS. 8A-8C). This signal produces a control field that can be detected by a suitable radio receiver (e.g., a 2.4 GHz receiver).

In an example shopping cart containment implementation, a radio receiver can be disposed in or on the cart (e.g., within a shopping cart wheel). When the cart gets within the range of the control field, the receiver detects the signal from the directional antenna 1. A cart containment system can be triggered to take a suitable action in response to the detected signal. For example, the cart may include an anti-theft system (e.g., an alarm, a brake, etc.), which can be activated in response to detection of the signal from the transmitter 100. Thus, such embodiments advantageously inhibit the shopping cart from being moved into and/or beyond the control field. In some implementations, if the cart is moved out of or away from the control field, the cart containment system may deactivate the anti-theft system (e.g., turn off the alarm, release the brake, etc.).

The actions taken by a cart (or other vehicle) that detects the signal in the control field are not limited to activation (or deactivation) of an anti-theft system. For example, in some implementations the cart (or other vehicle) may have a two-way transceiver that can receive the signal from the control field and in response transmit a radio tracking signal to a controller (in or on the cart and/or external to the cart, e.g., in a retail store). In response to the tracking signal, the controller can track the location of the cart, determine how long the cart is located in the vicinity of the control field, determine queuing/clustering of carts, communicate messages to the cart (including messages to activate an anti-theft system), and so forth. In some cases, the detected signal from the control field is used to provide location information to the cart (e.g., the location of the control field). For example, the location information can be communicated to a navigation system on the cart (e.g., a dead reckoning system) to update (or reset) an estimated position of the cart. Embodiments of the solar powered transmitter can be used with systems for tracking locations and statuses of wheeled vehicles described in U.S. Patent Application Publication No. US 2006/0244588, which is hereby expressly incorporated by reference in its entirety for the material specifically referred to herein and for all other material that it discloses.

The above are non-limiting examples of the actions or responses taken by a vehicle (e.g., a shopping cart) that comes into range of the control field broadcast by the transmitter 100. The solar powered transmitter 100 is not limited to applications associated with shopping carts (or other types of non-motorized vehicles). Other applications are possible. For example, embodiments of the transmitter 100 can be located at positions in or near a golf course to broadcast control signals used by golf cart containment system. Additionally, although embodiments of the transmitter described herein may be mounted outdoors so that the solar panel 14 can receive sunlight, in other embodiments, the transmitter 100 is mounted inside a structure or building (e.g., indoors) where the solar panel 14 can receive ambient light from windows and/or artificial light from light bulbs, etc. Many uses are contemplated.

Additional Examples and Embodiments

Additional, non-limiting, illustrative examples and embodiments are summarized below.

A solar powered antenna and transmitter assembly for the purpose of broadcasting a signal to receiver in a vehicle is provided. The antenna and transmitter comprise a solar power source and rechargeable power source, and a directional antenna capable of broadcasting a radio-frequency signal with a width and height such that a control field is generated. The assembly comprises a one-piece plastic molded printed circuit board and power source retainer with specific features that allow it to be suspended within the inside diameter of a cylindrical housing and prevented from falling out of the housing using a tooth molded into the housing's inside diameter. A slot molded into the inside diameter of the housing allows a screw driver, or similar tool, to be inserted into the slot for the purpose of temporarily distorting the shape of the printed circuit board and battery pack retainer allowing it to pass by a tooth molded into the inside diameter of the housing. The assembly also comprises an alignment and adjustment retainer of specific size that matches the geometry of an antenna substrate. The alignment and adjustment retainer allows directional alignment and adjustment of the antenna from outside a sealed housing. The adjustment retainer component incorporates an o-ring and mating sealing surface in an adjustment retainer cap that provide a moisture proof seal as the antenna position is adjusted. The assembly includes a tamper proof adjustment socket incorporated into the structure of the adjustment retainer component that allows insertion of a mating tool for adjusting the position of the antenna.

Optionally, the assembly includes a mechanism for mounting a display sign on the end of the housing. The display sign advantageously can be rotated to compensate for rotational adjustments of the housing and the contained antenna so that the sign is kept orientated toward an approaching person pushing a shopping cart towards the control field.

In various embodiments of the solar powered antenna and transmitter assembly, the power source comprises rechargeable batteries. In various embodiments, the radio-frequency comprises 2.4 GHz. In various embodiments, all components of the assembly are disposed inside a sealed housing structure. In various embodiments, the housing and all contained components can be mounted at the top of a post or pole in such a way that the assembly can be rotated about an axis concentric with that of the post or pole.

A light powered transmitter configured for broadcasting an electromagnetic control field to a region is provided. The transmitter comprises a housing that comprises a photovoltaic cell configured to generate electrical power in response to light and a rechargeable power source electrically coupled to the photovoltaic cell. The rechargeable power source can be configured to store at least a portion of the power generated by the photovoltaic cell. The housing also comprises an electromagnetic transmitter and a directional antenna electrically coupled to the electromagnetic transmitter. The antenna can be configured to broadcast an electromagnetic control field to a region. The housing comprises a longitudinal axis, and the antenna is rotatably mounted in the housing such that the antenna can be rotated around the longitudinal axis. In various embodiments, the light powered transmitter further comprises a transparent or translucent lens positioned to receive the light and direct at least a portion of the light onto the photovoltaic cell. The directed light can be converged toward the photovoltaic cell or focused (or imaged) on a portion of the photovoltaic cell.

In various embodiments of the light powered transmitter, the electromagnetic control field comprises a radio frequency signal. In various embodiments, the radio frequency signal comprises 2.4 GHz. In various embodiments, the housing is substantially weatherproof. In various embodiments, the housing further comprises an external mount adapted to permit the housing to be rotatably mounted to a structure. In various embodiments, the external mount is configured to be mounted to an elongated member such as, e.g., a post or a pole.

A method of installing a light powered transmitter is provided. The method comprises mounting the transmitter on a structure such that the transmitter can rotate in a first plane through a first angle of rotation and orienting the transmitter in the first plane. The method also includes angularly orienting an antenna in the transmitter to a desired angle. The method also includes securing the transmitter after orienting the transmitter in the first plane and angularly orienting the antenna.

Although described in the illustrative context of certain preferred embodiments and examples, it will be understood by those skilled in the art that the disclosure extends beyond the specifically described embodiments to other alternative embodiments and/or uses and obvious modifications and equivalents. Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any disclosed embodiment require more features than are expressly described. Rather, inventive aspects lie in a combination of fewer than all features of any single foregoing disclosed embodiment.

Also, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. Further, the example embodiments described herein have several features, no single one of which is indispensable or solely responsible for their desirable attributes.

Reference throughout this application to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments. Also, as used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed is:

1. A solar powered transmitter configured to transmit a radio-frequency control signal to a region, the transmitter comprising:
   an elongated housing having a longitudinal axis, the elongated housing comprising a mount configured to permit the elongated housing to be rotated around a mount axis, the mount axis non-parallel to the longitudinal axis;
   a directional antenna disposed substantially along the longitudinal axis of the elongated housing, the directional antenna configured to be at least partially rotatable around the longitudinal axis;
   an antenna adjustment mechanism coupled to the directional antenna, the antenna adjustment mechanism configured to permit the directional antenna to be at least partially rotated around the longitudinal axis, the antenna adjustment mechanism accessible from outside the housing;
   a solar panel disposed in a solar panel housing portion of the elongated housing, the solar panel housing portion comprising an optical element that is substantially transparent to visible light and configured to transmit the visible light to the solar panel;
   a rechargeable power storage medium disposed in the housing, the rechargeable power storage medium configured to be recharged by the solar panel; and a radio-frequency transmitter disposed in the housing, the radio-frequency transmitter electrically coupled to the directional antenna in order to transmit the radio frequency control signal.

2. The solar powered transmitter of claim 1, wherein the elongated housing is substantially cylindrical.

3. The solar powered transmitter of claim 1, wherein the directional antenna comprises an array of antenna elements.

4. The solar powered transmitter of claim 1, wherein the directional antenna is configured to provide a radiation pattern comprising a main lobe, side lobes, and backlobes, with the side lobes at least 10 dB lower than the main lobe, the back lobes at least 30 dB lower than the main lobe.

5. The solar powered transmitter of claim 4, wherein the radiation pattern in a first direction has a 3 dB beamwidth less than about 24 degrees and a 3 dB beamwidth greater than about 45 degrees in a second direction, the second direction substantially perpendicular to the first direction.

6. The solar powered transmitter of claim 1, wherein the antenna adjustment mechanism comprises a post mechanically coupled to the antenna, the post accessible via an opening in the elongated housing such that the post can be manually rotated.

7. The solar powered transmitter of claim 6, wherein the post comprises a shaped recess configured to receive the correspondingly shaped end of a tool, the tool manually operable to rotate the post.

8. The solar powered transmitter of claim 1, wherein the solar panel comprises an array of photovoltaic cells.

9. The solar powered transmitter of claim 1, wherein the optical element comprises a lens.

10. The solar powered transmitter of claim 1, wherein the optical element has optical power and is configured to converge at least a portion of the transmitted visible light onto the solar panel.

11. The solar powered transmitter of claim 1, wherein the rechargeable power storage medium comprises one or more rechargeable batteries.

12. The solar powered transmitter of claim 1, wherein the radio-frequency control signal comprises a 2.4 GHz signal.

13. The solar powered transmitter of claim 1, further comprising a controller disposed in the elongated housing, the controller configured to control recharging of the rechargeable power storage medium.

14. The solar powered transmitter of claim 13, wherein the controller is further configured to use power from the solar panel that exceeds an amount for recharging the rechargeable power storage medium to provide power to the radio-frequency transmitter.

15. The solar powered transmitter of claim 1, wherein the mount comprises an elongated member comprising a recess configured to receive an end of a support post.

16. The solar powered transmitter of claim 15, wherein the mount is disposed on a lower surface of the elongated housing and the solar panel housing portion is disposed on an upper surface of the elongated housing.

17. The solar powered transmitter of claim 1, further comprising a display sign mounted to the elongated housing.

18. The solar powered transmitter of claim 17, wherein the display sign is configured to be adjustable over a range of angles relative to the longitudinal axis of the elongated housing.

19. The solar powered transmitter of claim 1, wherein the elongated housing is configured to be water-resistant.

20. A light powered transmitter configured for broadcasting an electromagnetic control field to a region, the light powered transmitter comprising:
a housing having a longitudinal axis, the housing comprising:
a photovoltaic cell configured to generate electrical power in response to light;
a rechargeable power source electrically coupled to the photovoltaic cell, the rechargeable power source configured to store at least a portion of the power generated by the photovoltaic cell;
an electromagnetic transmitter; and
a directional antenna electrically coupled to the electromagnetic transmitter, the directional antenna configured to broadcast an electromagnetic control field to a region, the directional antenna rotatably mounted in the housing such that the antenna can be rotated around the longitudinal axis,
wherein the housing further comprises a transparent or translucent optical element configured to receive the light and converge at least a portion of the light onto the photovoltaic cell.

21. The light powered transmitter of claim 20, wherein the rechargeable power source comprises one or more rechargeable batteries.

22. The light powered transmitter of claim 20, wherein the rechargeable power source comprises one or more ultracapacitors.

23. The light powered transmitter of claim 20, wherein the electromagnetic transmitter is configured to provide a radio-frequency signal to the directional antenna.

24. The light powered transmitter of claim 23, wherein the radio-frequency comprises 2.4 GHz.

25. The light powered transmitter of claim 20, wherein the directional antenna comprises an array of antenna elements.

26. The light powered transmitter of claim 20, wherein the housing further comprises a mount configured to allow the transmitter to be adjustably mounted to a structure.

27. The light powered transmitter of claim 20, further comprising a display sign adjustably mounted to the housing.

28. The light powered transmitter of claim 20, further comprising a turning mechanism mechanically coupled to the directional antenna, the turning mechanism accessible from outside the housing, the turning mechanism manually operable to at least partially rotate the antenna.

29. A solar powered transmitter for transmitting a radio-frequency signal, the solar powered transmitter comprising:
means for transmitting a radio-frequency signal, the transmitting means comprising means for directionally radiating the radio-frequency signal;
means for generating electrical power from sunlight;
means for storing electrical power, the power storing means rechargeable by the power generating means;
means for housing the signal transmitting means, the power generating means, and the power storing means, the housing means having a longitudinal axis, the housing means configured to allow the radiating means to rotate at least partially around the longitudinal axis, the power generating means disposed in the housing means so that the power generating means can receive the sunlight; and
means for mounting the solar powered transmitter, the mounting means configured to allow the transmitter to be rotated around a mounting axis that is non-parallel to the longitudinal axis.

30. The solar powered transmitter of claim 29, wherein the radiating means comprises an antenna.

31. The solar powered transmitter of claim 29, wherein the power generating means comprises a photovoltaic cell.

32. The solar powered transmitter of claim 29, wherein the power storing means comprises a rechargeable battery.

33. The solar powered transmitter of claim 29, further comprising means for controlling the recharging of the power storing means.

34. The solar powered transmitter of claim 33, wherein the controlling means is further configured for operating the signal transmitting means.

35. The solar powered transmitter of claim 33, wherein the controlling means comprises a microprocessor.

* * * * *